UNITED STATES PATENT OFFICE.

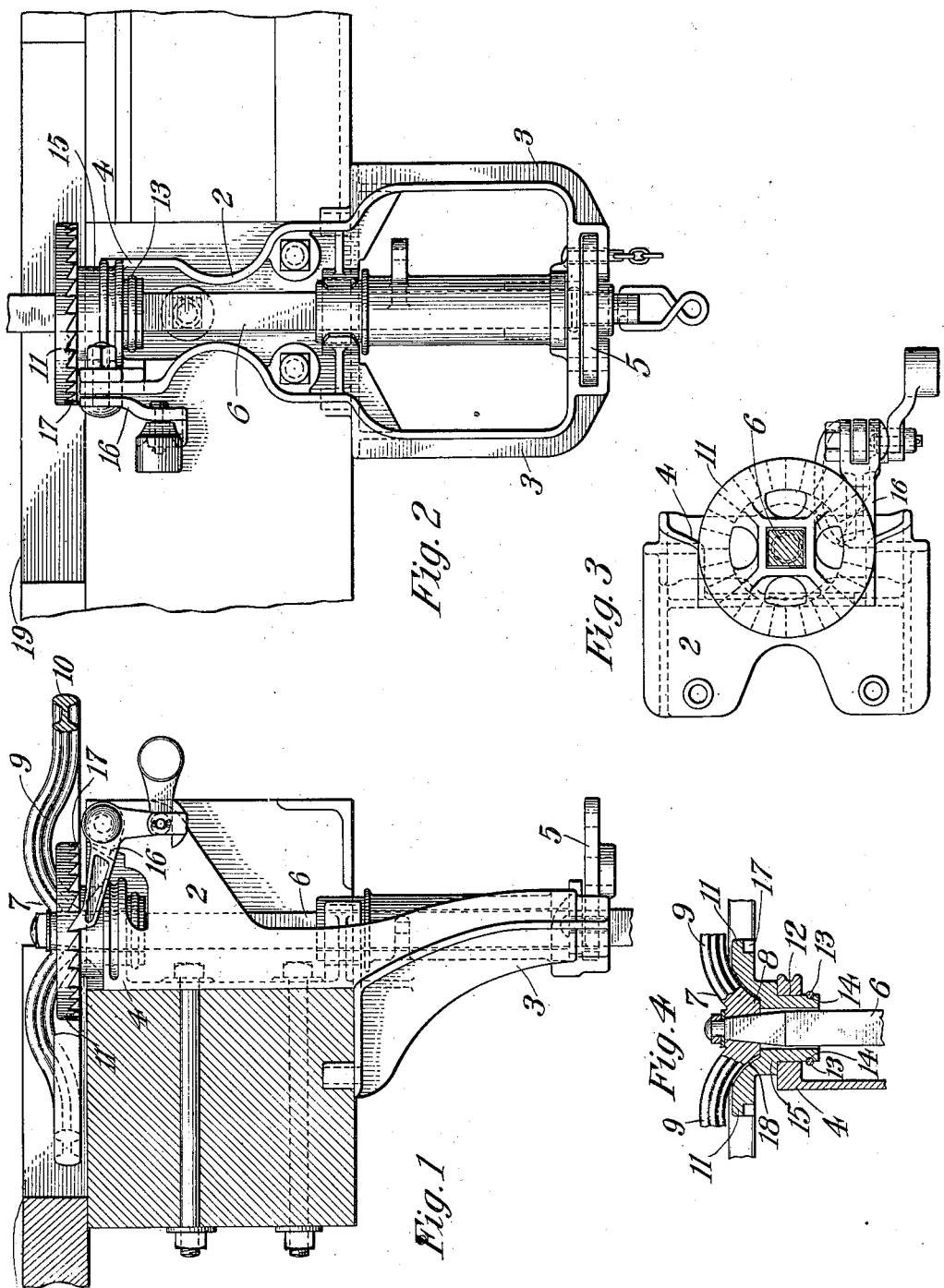

FREDERICK J. TRUMPER, OF CLEVELAND, OHIO, ASSIGNOR TO THE NATIONAL MALLEABLE CASTINGS COMPANY, OF CLEVELAND, OHIO.

HAND BRAKE MECHANISM.

1,202,009.     Specification of Letters Patent.     Patented Oct. 17, 1916.

Application filed December 5, 1913. Serial No. 804,792.

*To all whom it may concern:*

Be it known that I, FREDERICK J. TRUMPER, a citizen of the United States, residing at Cleveland, Cuyahoga county, Ohio, have invented Improvements in Hand Brake Mechanism, of which the following is a specification, reference being had to the accompanying drawings, in which—

Figure 1 is an elevation, partly in section, of my improved device applied to the end sill of a car and showing the brake shaft and brake wheel in lowermost position; Fig. 2 is a front elevation thereof, with the brake shaft in raised position; Fig. 3 is a plan view showing the brake shaft in section, and Fig. 4 is a detail of the ratchet wheel, showing the brake wheel in lowermost position.

My invention relates to hand-operated brake mechanism of the type shown in the patent granted to Walter E. Coffin, No. 1,098,428, dated June 2, 1914, and consists in an improvement thereon by which the top of the brake wheel and the brake shaft may be lowered below the level of the floor of the car. To this end I employ a ratchet wheel secured to the bracket upon which the mechanism is mounted, having teeth on its under side for engaging a pivoted pawl, and the upper side of the ratchet is recessed to permit the entrance of the hub of the brake wheel therein.

My invention also consists in the construction and operation of the parts which I shall hereinafter describe and claim.

Referring to the drawings, 2 is the bracket secured to the end sill of a car, the lower part of which comprises a brake shaft step 3 and the upper part of which comprises a mounting 4 for the ratchet and pawl mechanism. Pivoted in the lower portion of the step 3 is a bearing plate 5, which supports the brake shaft 6 when in raised position. The brake shaft 6, which is preferably rectangular in cross section, has a brake wheel 7 mounted on the upper end thereof. The brake wheel 7 has a beveled hub 8 and a dished portion 9 between the hub 8 and its periphery 10, for the purpose of seating in the ratchet wheel 11. The ratchet wheel 11 is secured in the aperture 12 of the mounting 4 by means of a retainer 13, which seats in a groove 14 in the ratchet wheel hub 15. The retainer 13 holds the ratchet wheel 11 from vertical movement relative to its mounting 4, and thereby prevents its accidental disengagement from the pivoted pawl 16. Upon the under side of the ratchet wheel 11 are teeth 17 which coöperate with the pawl 16.

The recess 18 in the ratchet wheel is formed so as to receive the hub 8 of the brake wheel 7, and the dished portion 9 of the brake wheel 7 just clears the periphery of the ratchet wheel 11, thereby permitting the brake wheel 7 to be dropped entirely below the level of the car floor 19 without affecting the operation of the mechanism.

When the car is unloaded the brake shaft 6 will be in the raised position shown in Fig. 2, in which the brake shaft 6 is supported by the bearing plate 5. When it is desired to load the car with materials projecting over its ends, the bearing plate 5 is moved into the position shown in Fig. 1, and the brake shaft 6 is then lowered until the hub 8 of the brake wheel 7 seats in the recess 18 of the ratchet wheel 11, in which position the dished portion 9 of the brake wheel 7, which is the highest portion of the mechanism, is below the floor level 19 of the car. It will be seen that the recess 18 of the ratchet 11 and the corresponding tapering of the hub 8 of the brake wheel permit the lowering of the brake wheel to such an extent that its hub 8 and periphery 10 lie in the same horizontal plane as the ratchet wheel 11.

It is obvious that various modifications may be made in the construction which I have shown and described herein without departing from my invention.

What I claim is:

1. In hand brake mechanism, pawl and ratchet mechanism, a bracket comprising a brake shaft step and a support for the pawl and ratchet mechanism, means for preventing vertical movement of the ratchet wheel relative to the bracket, and a hand wheel adapted to seat in and be supported on said ratchet wheel.

2. In hand brake mechanism, a bracket supporting a brake shaft and pawl and ratchet mechanism, the brake shaft being capable of vertical endwise movement and having mounted thereon a brake wheel, the brake wheel having a hub and a periphery adapted when the shaft is in lowermost position to lie in the same horizontal plane as the ratchet wheel.

3. A brake wheel having a hub adapted to be secured to a brake shaft, a rim, and intermediate connections between said hub and rim, said intermediate connections being dished between the hub and rim, and said hub and rim both lying in lower horizontal planes than the dished portions of the intermediate connections, substantially as described.

4. In a hand brake mechanism, a bracket having a portion adapted to receive a journal, a ratchet wheel having a hub journaled in said bracket, a pawl coöperating with teeth on said ratchet wheel, said hub having a groove in its periphery below the journal bearing, and a retainer adapted to surround said hub and seat in said groove, and to prevent vertical movement of the ratchet wheel relative to the bracket, whereby said ratchet wheel is held in coöperative position with said pawl.

FREDERICK J. TRUMPER.

Witnesses:
CHESTER K. BROOKS,
HARRY E. ORR.